United States Patent
Melkote et al.

(10) Patent No.: US 7,414,995 B1
(45) Date of Patent: Aug. 19, 2008

(54) MODULAR RADIO ACCESS POINT

(75) Inventors: Keerti G. Melkote, San Jose, CA (US);
Pankaj S. Manglik, San Jose, CA (US);
Joel F. Adam, Cupertino, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 1160 days.

(21) Appl. No.: 10/237,315

(22) Filed: Sep. 9, 2002

(51) Int. Cl.
*H04Q 7/24* (2006.01)
(52) U.S. Cl. .................. 370/338; 370/400; 709/249
(58) Field of Classification Search .............. 370/476, 370/338, 400, 352; 709/249
See application file for complete search history.

(56) References Cited

U.S. PATENT DOCUMENTS

| | | | |
|---|---|---|---|
| 5,095,480 A | 3/1992 | Fenner | |
| 5,355,520 A | 10/1994 | Freeburg et al. | |
| 5,623,495 A * | 4/1997 | Eng et al. | 370/397 |
| 5,664,765 A | 9/1997 | Pickrell | |
| 5,917,900 A | 6/1999 | Allison et al. | |
| 6,067,297 A | 5/2000 | Beach | |
| 6,104,928 A | 8/2000 | Waugh | |
| 6,167,062 A | 12/2000 | Hershey et al. | |
| 6,405,058 B2 | 6/2002 | Bobier | |
| 6,421,714 B1 | 7/2002 | Rai et al. | |
| 6,539,207 B1 | 3/2003 | del Castillo et al. | |
| 6,768,721 B1 | 7/2004 | Schmitz et al. | |
| 7,146,433 B2 | 12/2006 | Cromer et al. | |
| 7,149,196 B1 | 12/2006 | Bims | |
| 2002/0133528 A1 * | 9/2002 | Zolti et al. | 709/100 |
| 2003/0002467 A1 * | 1/2003 | Leung | 370/338 |
| 2003/0026198 A1 | 2/2003 | Diepstraten et al. | |
| 2004/0022222 A1 | 2/2004 | Clisham | |
| 2004/0030871 A1 | 2/2004 | Erez, et al. | |
| 2004/0032871 A1 * | 2/2004 | Sharon et al. | 370/400 |
| 2005/0185632 A1 | 8/2005 | Draves et al. | |

OTHER PUBLICATIONS

United States Office Action dated Mar. 28, 2008 for U.S. Appl. No. 11/098,903, filed on Apr. 04, 2005 entitled Reconfigurable Access Point.
United States Office Action dated Jan. 4, 2008 for U.S. Appl. No. 11/098,903, filed on Apr. 04, 2005 entitled Reconfigurable Access Point.
United States Office Action dated Jul. 2, 2007 for U.S. Appl. No. 11/098,903, filed on Apr. 04, 2005 entitled Reconfigurable Access Point.

* cited by examiner

*Primary Examiner*—Ricky Ngo
*Assistant Examiner*—Dady Chery
(74) *Attorney, Agent, or Firm*—Blakely, Sokoloff, Taylor & Zafman

(57) ABSTRACT

In general, one embodiment of the invention is a radio access point (RAP) system adapted to a wired network. The RAP system comprises a radio access point and a switch coupled together by an interconnect. The radio access point includes components to digitally sample a detected, wireless analog signal thereby producing digital data. The digital data is placed into a frame for transmission over the interconnect. The switch includes a radio access point (RAP) component that recovers the digital data from the frame transmitted over the interconnect. The RAP component processes the digital data to recover media access control (MAC) frames containing data for subsequent transmission over the wired network.

21 Claims, 4 Drawing Sheets

MODULAR RADIO ACCESS POINT

FIELD

Embodiments of the invention relate to the field of wireless communications, in particular, to a wireless local area network (WLAN) device.

GENERAL BACKGROUND

Over the last decade or so, for most businesses, it has become a necessity for employees to share data over local area networks. To improve efficiency, enhancements have added to a local area network such as remote wireless access. This enhancement provides an important extension in forming a wireless local area network (WLAN).

Typically, a WLAN features a wireless network interface card and a wireless access point (AP). The network interface card enables one or more wireless devices, such as a laptop computer or personal digital assistant, to communicate with the AP over the air. The AP operates as a relay station by receiving data frames from the network interface card and transmitting data from these frames to a fixed, backbone network. Thus, the AP supports communications with both a wireless network and a wired network.

Over the past few years, a number of WLAN standards have been developed. For instance, the 802.11 standard was originally developed for 1 Mbps and 2 Mbps data rates approximately in a 2.4 gigahertz (GHz) band. Other standards include "Wireless LAN Medium Access Control (MAC) and Physical Layer (PHY) specifications: Higher-Speed Physical Layer Extension in the 2.4 GHz Band" (IEEE 802.11b, 1999) and "Wireless LAN Medium Access Control (MAC) and Physical Layer (PHY) specifications: High-Speed Physical Layer in the 5 GHz Band" (IEEE 802.11a, 1999). IEEE 802.11b is a standard for a data rate up to 11 Mbps generally in the 2.4 GHz band. IEEE 802.11a is a standard for a data rate up to 54 Mbps generally in the 2.4 GHz band.

Additional 802.11 standards are being developed for supporting additional functionality. For instance, the standard which is expected to be the most widely deployed in the near future is the revised IEEE 802.11 standard "Wireless LAN Medium Access Control (MAC) and Physical Layer (PHY) specifications" (IEEE 802.11, 1999). IEEE 802.11 actually encompasses a number of WLAN standards that have already been formalized.

One problem associated with conventional APs is that such equipment is designed to support specific, existing wireless network standards. If a new WLAN standard is developed and support for this standard is desired, a new set of APs supporting the new WLAN standard must be deployed. This can be accomplished by deploying new APs operating in parallel with old APs or replacing the old APs with newer APs supporting both old and new WLAN standards. In either case, support for any new WLAN standard requires deployment of a whole new array of APs, which is quite costly.

BRIEF DESCRIPTION OF THE DRAWINGS

The invention may best be understood by referring to the following description and accompanying drawings that are used to illustrate embodiments of the invention.

DETAILED DESCRIPTION

Herein, certain embodiments of the invention relate to a Radio Access Point system and a method of communicating between components of the Radio Access Point system. Normally, a radio access point is deployed within a wireless network (WLAN). The WLAN may be configured in accordance with Institute of Electrical and Electronics Engineers (IEEE) 802.11, different types of High Performance Radio Local Area Networks (HiperLAN) or subsequently published specifications.

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

In the following description, certain terminology is used to describe features of the invention. For example, "components" may include hardware and/or software module(s) that perform a certain function on incoming information. A "software module" is executable code such as an operating system, an application, an applet or even a routine. The module may be stored in any appropriate storage medium such as a programmable electronic circuit, a semiconductor memory device, a volatile memory (e.g., random access memory, etc.), a non-volatile memory (e.g., read-only memory, flash memory, etc.), a floppy diskette, an optical disk such as a compact disk (CD) or digital versatile disc (DVD), a hard drive disk, tape, or any kind of interconnect (defined below).

An "interconnect" is generally defined as an information-carrying medium that establishes a communication pathway. Examples of the medium include a physical medium (e.g., electrical wire, optical fiber, cable, bus traces, etc.) or a wireless medium (e.g., air in combination with wireless signaling technology).

"Information" is defined as data, address, control or any combination thereof. For transmission, information is transmitted as a frame formed by a single packet or a series of packets, where each packet features a predetermined number of bits of information.

Figure 1:
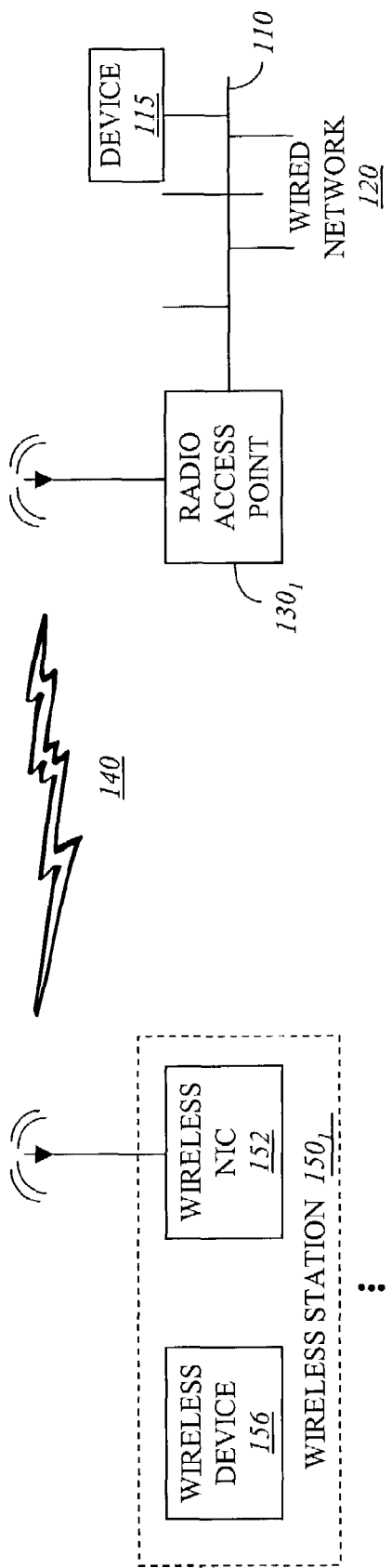
FIG. 1 is an exemplary embodiment of a wireless local area network including a Radio Access Point system.

Referring to FIG. 1, an exemplary embodiment of a wireless network (WLAN) 100 in accordance with the invention is illustrated. WLAN 100 comprises an interconnect 110 being a physical medium that forms part of a wired network 120. The wired network 120 provides resources available for users of the network 100. Such resources may include data stored on a device 115 coupled to interconnect 110.

The interconnect 110 is further coupled to one or more (N) Radio Access Point (RAP) systems $130_1$-$130_N$ that communicate over the air 140 with one or more (M) wireless stations (STAs) $150_1$-$150_m$. For illustrative purposes, only one RAP system $130_1$ and one STA $150_1$ are shown in detail, although multiple versions of each can be deployed.

STA $150_1$ includes a removable, wireless network interconnect card (NIC) 152 that is separate from or employed within a wireless device 156 that processes information (e.g., computer, personal digital assistant "PDA", telephone, alphanumeric pager, etc.). Normally, NIC 152 operates as a wireless transceiver, but may be configured to operate with only transmit or receive functionality.

STA $150_1$ communicates with and accesses information from RAP system $130_1$ over the air 140 in accordance with IEEE 802.11 communications protocol or another WLAN standard protocol including any type of HiperLAN protocol. Hence, RAP system $130_1$ generally operates as a transparent bridge connecting both a wireless network featuring STA $150_1$ with the wired network 120.

RAP system $130_1$ is an electronic device that provides a bi-directional communications between one or more STAs $150_1$-$150_M$ and a network such as wired network 120. RAP system $130_1$ is communicatively coupled to wired network 120 over an interconnect, which may be a physical medium (as shown) or a wireless medium. The wired network 120 can be of any type of wired network, including but not limited or restricted to Ethernet, Token Ring, Asynchronous Transfer Mode (ATM) or the like.

Figure 2:
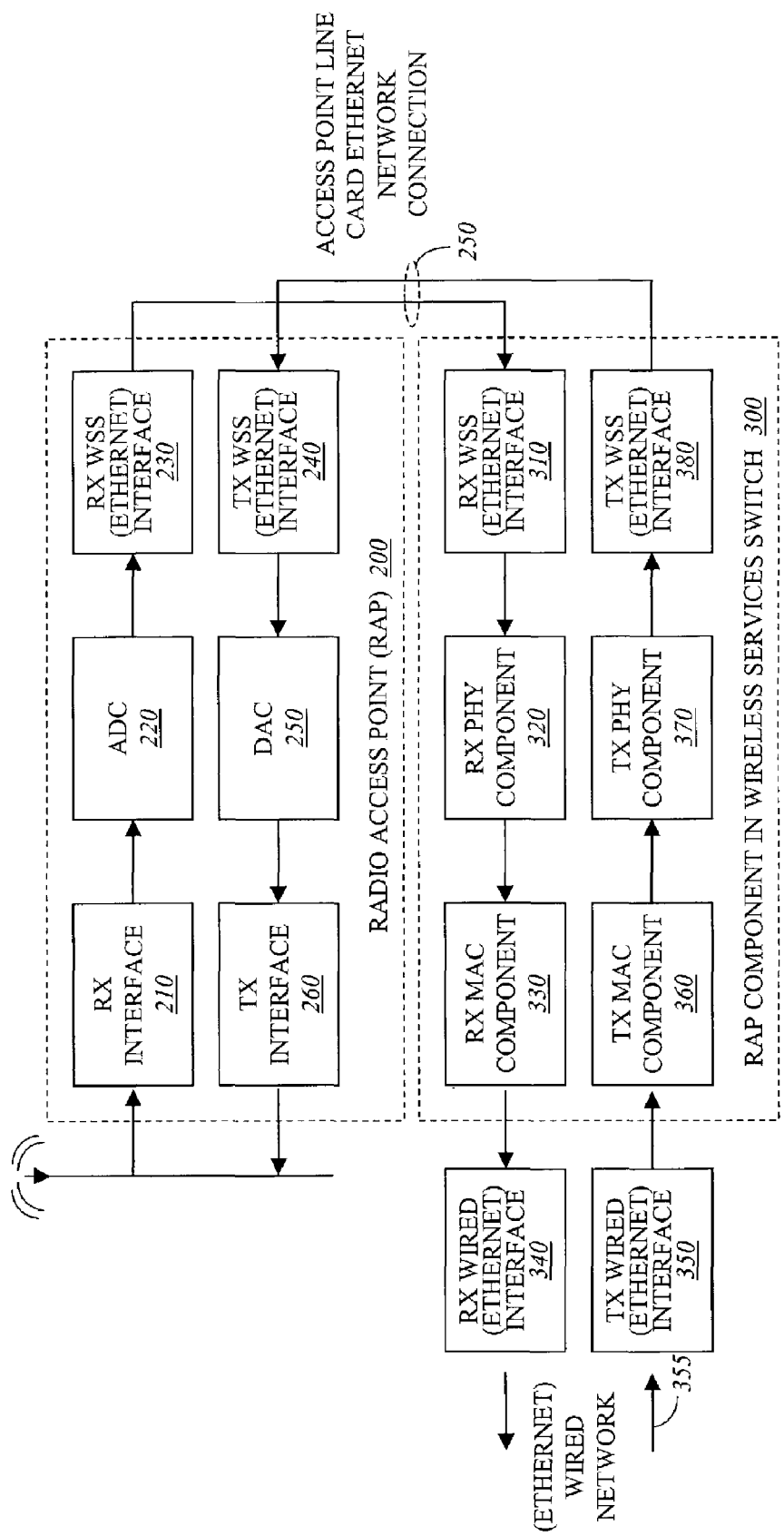
FIG. 2 is an exemplary embodiment of the Radio Access Point (RAP) system of FIG. 1.

Referring now to FIG. 2, an exemplary embodiment of a radio access point (RAP) system $130_1$ is shown. The RAP system $130_1$ comprises a RAP 200 and a programmable and/or removable RAP component 300 being part of a switch (referred to as a "wireless services switch" (WSS)). This separation of components sensitive to wireless transmission/reception (remaining in RAP 200) and components involved with Media Access Control (MAC) processing (moved to a switch) enables cost effective updating of RAPs without their removal.

In one embodiment, the "WSS" is an Ethernet switch that can support the implementation of one or more RAP components, one or more of which can be placed on removable line cards. In general, RAP components provide different data processing capabilities as well as modulation and/or demodulation schemes. This modular line card design provides a modular implementation that can be used for client customization.

As shown, RAP component 300 features Physical and/or Media Access Control (MAC) components 320, 330, 370, 380 operating in accordance with selected WLAN standards, which are placed in a switch in lieu of their standard placement within the conventional AP itself. This provides a cost effective upgrades. For instance, RAP component 300 may be adapted as a removable line card, which can be removed and replaced with a card having MAC components supporting new WLAN standards. In another embodiment, where MAC processing of RAP component 300 is performed by software, such software may be re-programmed through a variety of techniques, including transmission of control frames over the air, direct download through a port of the switch, or even removal and reprogramming of Flash memory or another type of programmable read only memory (e.g., PROM, EPROM, EEPROM, etc.).

More specifically, as shown in FIG. 2, on the receive (RX) side, RAP 200 comprises a RX interface 210 and an analog-to-digital converter (ADC) 220.

For one embodiment of the invention supporting 802.11 communication standards, an antenna 205 receives an incoming data stream 206. Data stream 206 includes 802.11 MAC frames encoded and carried within a frequency channel that is located within a carrier frequency band. The carrier frequency band is located within typical radio frequency (RF) band of frequencies. For example, the RF band may generally fall within an approximate range of 2.4-2.5 GHz or perhaps an approximate range of 5-5.25 GHz. It is contemplated, though, that the invention may be applied to any frequency range.

The RX interface 210 is configured to isolate the frequency channel on which data is carried from all the other frequencies received on the antenna 205. This may be accomplished through a tunable filter tuned to a center frequency of a channel of interest. The data channel undergoes a frequency shifting from the carrier band to baseband and a resulting analog radio signal 215 is routed to ADC 220.

ADC 220 samples baseband analog radio signal 215 and converts it into a series of digital values 225. The digital values 225 are transferred between RAP 200 and RAP component 300 over a WSS interconnect 250, which provides coupling between complementary WSS (Ethernet) interface components 230 and 310. In one embodiment, WSS component 310 is configured as an Ethernet connector for a removable line card adapted for coupling to WSS interface component 230. The framing of the digital values 225 is described in FIG. 3.

The WSS interconnect 250 is capable of transferring sampled radio signals of varying bit rates between the RAP 200 and RAP component 300 remotely located there from. A range of bit rates needs to be supported since each wireless LAN standard will result in a different bit rate.

The RAP architecture supports future WLAN standards by antenna 205 and RX interface 210, being configured to simultaneously receive and transmit all of the carrier bands that may be used for wireless networking. Moreover, radio signals from all of the desired carrier bands are sampled by ADC 220 in parallel, thereby ADC 220 may have more than one ADC component. Also, WSS interconnect 250 is capable of transferring digitally sampled radio signals of varying bit rates between RAP 200 and RAP component 300. A range of bit rates needs to be supported since each wireless LAN standard will result in a different bit rate across this interconnect 250.

Figure 3:
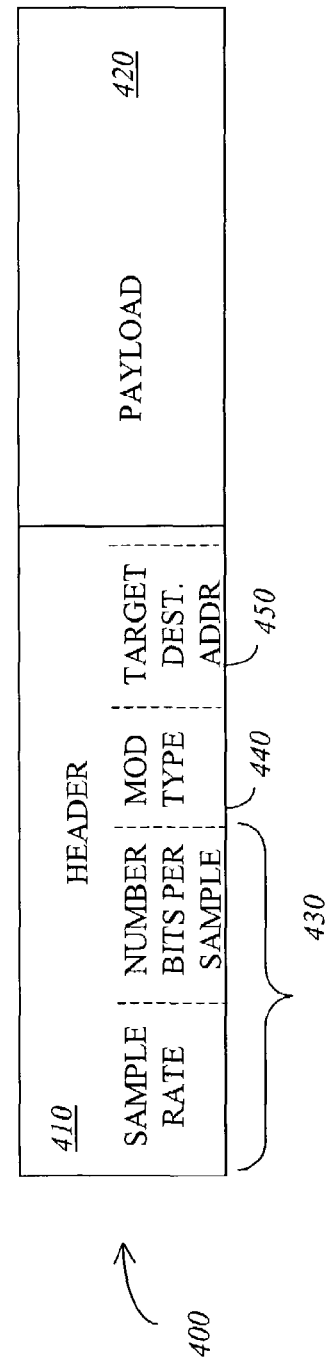
FIG. 3 is an exemplary embodiment of a communication protocol between a Radio Access Point (RAP) and a RAP component of a wireless services switch of the RAP system of FIG. 2.

Referring to FIG. 3, an exemplary embodiment of the operations of an identification protocol for framing the digitally sampled values 225 into a format for transmission over WSS interconnect 250 is shown. The general purpose of the identification protocol is to frame the radio sample stream with a small amount of overhead so that the radio channels the sampled values 225 belong to can be identified.

For this embodiment, one or more frames 400 are exchanged between RAP 200 and RAP component 300. Each switching frame 400 comprises a header 410 and a payload 420. Payload 420 includes data being transmitted. In one embodiment, header 410 carries information related to the digital sampling 430 of the baseband analog radio signal. Such information may include, for example, a sample rate 431 and a number of bits per sample 432. In another embodiment, information within header 410 may include, in addition to or in lieu of information related to the digital sampling 430, an identifier 440 of the type of modulation supported, MAC address or port address of the target destination 450 or the like.

Hence, in the receive (RX) direction, this information is used to properly demodulate the radio signal and recover a data stream. In the transmit (TX) direction, however, this information is used by the RAP 200 to create the radio signal from the data stream.

Referring back to FIG. 2, RAP component 300 comprises WSS interface component 310, a RX Physical (PHY) component 320, a RX MAC component 330 and a RX wired network interface 340. As referenced, WSS interface component 310 removed the series of digital values 225 from packets transferred over interconnect 250.

RX PHY component 320 includes a programmable processor, such as a digital signal processor for example, demodulates the digitally sampled baseband signal (e.g., digital values 225) to recover MAC frames. Typically, a fixed number of demodulation protocols are stored and supported by RX PHY component 320. For instance, RAP $130_1$ may support both 802.11a and 802.11b demodulation protocols as well as other protocol types. This differs from conventional APs supporting one demodulation protocol.

RX MAC component 330 implements the receive portion of access control functions provided by the MAC frames, which are necessary for negotiating access to a shared wireless transmission media (e.g. air). RX MAC component 330 is configured to perform a number of operations, some of which may include, for example, (i) analysis of the integrity of received frame, (ii) handling of timing, priority and fragmentation as well as (iii) review of special fields invoked in the header of the MAC frame, (iv) isolation of data frames from management frames, and (v) determination whether the MAC frame is encrypted. In addition, RX MAC component 330 also produces a data stream without any 802.11 protocol content. RX MAC component 330 supports multiple WLAN standards such as both IEEE 802.11a, IEEE 802.11b and can support future WLAN standards due to its programmability.

For this embodiment of the invention, RX wired network interface 340 contains transmit MAC and PHY layer functions for the communication protocol supported for the wired network 120. In particular, for this embodiment of the invention, RX wired network interface 340 is responsible for framing the data stream with 10/100/1000 Ethernet protocol and transmitting the resulting frames to wired network 120.

Referring still to FIG. 2, on the transmit (TX) side, RAP component 300 further comprises a TX wired network interface 350, a TX MAC component 360, a TX Physical (PHY) component 370 and TX WSS interface component 380.

For this embodiment of the invention, TX wired network interface 350 contains receive MAC and PHY layer functions to receive and process Ethernet MAC frames 355 routed from wired network 120. TX MAC component 360 implements the transmit portion of the access control functions, which are necessary for negotiating access to a shared wireless transmission media (e.g. air). This component converts MAC frames configured according to a wired protocol to MAC frames in accordance with a WLAN protocol (e.g., IEEE 802.11a, IEEE 802.11b or any future WLAN standard).

TX PHY component 370 modulates the WLAN-based MAC frame to create a digital baseband radio signal. Typically, a fixed number of modulation protocols are stored and supported by TX PHY component 370. For instance, RAP $130_1$ may support both 802.11a and 802.11b modulation protocols as well as other modulations.

TX WSS interface component 380 is configured to produce one or more frames, which contain the samples forming the digital baseband radio signal for transmission across interconnect 250.

As further shown in FIG. 2, RAP 200 also comprises a complementary WSS interface component 240, a digital-to-analog converter (DAC) 250 and a TX interface 260. WSS interface component 240 recovers the samples of digital baseband radio signal 245 from the transmitted frame(s). DAC 250 converts the digital baseband radio signal into an analog baseband radio signal 255 that is routed to TX interface 260. The TX interface 260 is responsible for taking analog baseband radio signal 255 from DAC 250 and shifting its frequency to place it in an appropriate channel within the carrier band.

RAPs can be designed to be very flexible in terms of the number and location of the frequency channels, which are received and transmitted. Multiple channels within the same band can be accessed. An example of this configuration is a RAP, which can access multiple channels within the 2.4 GHz band simultaneously for an 802.11b application. Another possibility is for individual channels within different bands accessed at the same time. An example of this configuration is a RAP, which can access one channel within the 2.4 GHz band and one within the 5 GHz band simultaneously for an 802.11a+b application. Each channel captured represents a sample stream which should be carried over the WSS interconnect 235 so the bit rate of the interface increases as more channels are captured.

As an illustration, some of the technical details of RAP $130_1$ which supports both IEEE 802.11a and 802.11b standards are described. RAP $130_1$ samples a single 802.11a frequency channel and a single 802.11b frequency channel. The radio signal samples are then encapsulated in a frame configured in accordance with a lightweight, identification protocol as set forth in FIG. 3. However, in this embodiment, the protocol identifies two sample streams being transmitted over WSS interconnect 250 of FIG. 2. This would involve creation of a field to identify the presence of two sample streams within WSS frames 400.

For instance, an 802.11a channel is 20 megahertz (MHz) wide. Assuming three times over-sampling is needed to allow the data to be recovered, the bit rate of the 802.11a sample stream is:

Channel width*over-sampling*number bits/sample 20 MHz*3*6 bits/sample=360 megabits/second An 802.11b channel is 22 MHz wide. Assuming 3 times over-sampling is needed to allow the data to be recovered, the bit rate of the 802.11b sample stream is:

22 MHz*3*6 bits/sample=396 Mb/s

Assuming that RAP $130_1$ of FIG. 2 captures both the 802.11a and 802.11b signals in a generally continuous manner, the bit rate required to carry the radio signal sample information over the WSS interconnect is 360+396=756 Megabits/second. A light weight identification protocol should then be added on top of this. Given this bit rate, the WSS interconnect 250 of FIG. 2 could be implemented as a Gigabit Ethernet link which can carry 1 gigabits per second (Gbps) of traffic.

Figure 4A:
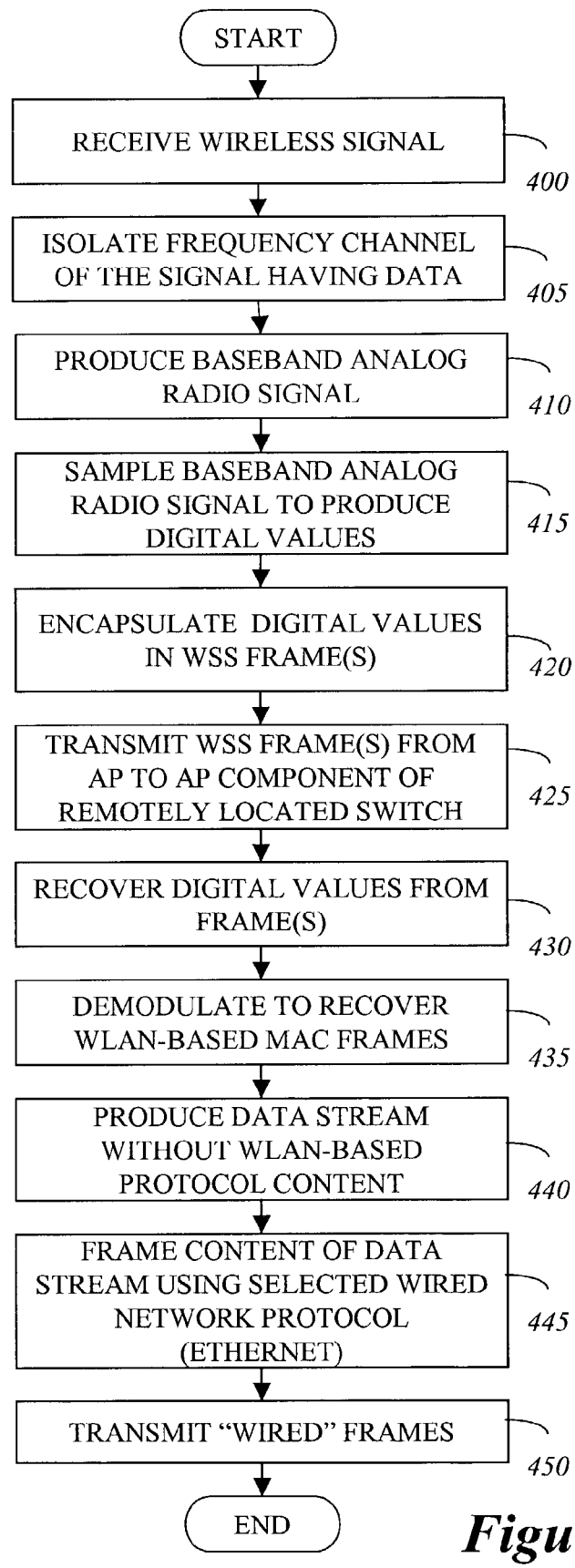
FIGS. 4A & 4B are exemplary embodiments of a flowchart identifying the communications between the RAP and the RAP component of a wireless services switch of the RAP of FIG. 2.
Figure 4B:
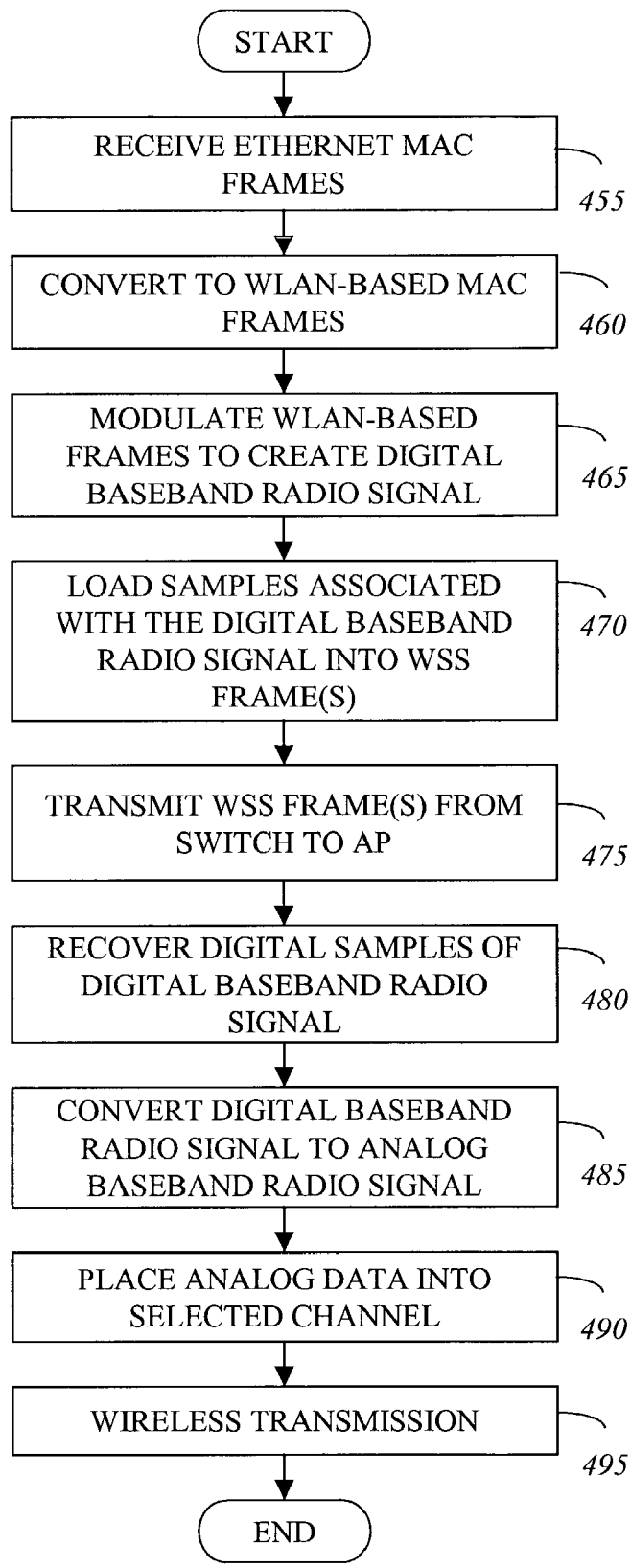

Referring now to FIGS. 4A and 4B, exemplary embodiments of a flowchart identifying the communications between the RAP and the RAP component of a wireless services switch of the RAP $130_1$ of FIG. 2 is shown.

As shown in FIG. 4A, in response to receipt of a wireless signal by a RAP, the frequency channel on which data is carried is isolated from all the other frequencies received on the antenna (blocks 400 & 405). This channel undergoes a frequency adjustment from the carrier band to a baseband, which produce a baseband analog radio signal (block 410).

The baseband analog radio signal is sampled to produce a series of digital values (block 415). A stream of digital values is encapsulated into a frame with a minimal amount of overhead (block 420). For example, a header of the frame may only include sampling information (rate, number bits per second, etc.) so the radio channels that the digital values belong to can be identified. The frame is transferred between the RAP and the RAP component over the WSS interconnect of FIG. 2 (block 425).

As the frame is received by the RAP component, the series of digital values are removed from the frame (block 430). Thereafter, the digitally sampled baseband signal (digital values) is demodulated to recover MAC frames (block 435). Information within portions of these MAC frames is used to negotiate access to a shared wireless transmission media (e.g.

air) and to produce a data stream without any 802.11 or WLAN-based protocol content (block 440)

Finally, a RX wired network interface frames the data stream in accordance with a selected network protocol (e.g., Ethernet) and transmits the resulting frames into the wired network 120 (blocks 445 and 450)

Referring to FIG. 4B, in response to receiving frames (e.g., Ethernet MAC frames) over wired network for wireless transmission, these Ethernet MAC frames are converted to WLAN-based MAC frames. In general, such conversion may include the addition of an AP address field and a network address field to headers of the Ethernet MAC frames. Then, the resultant WLAN-based MAC frames are modulated to create a digital baseband radio signal (blocks 455, 460 and 465).

Herein, one or more samples forming the digital baseband radio signal are loaded into one or more frames for transmission from the switch to the RAP across the WSS interconnect (blocks 470 and 475). Thereafter, the digital baseband radio signal is recovered prior to conversion and production of an analog baseband radio signal (blocks 480 & 485). The analog baseband radio signal is adapted to place such data in an appropriate channel with the carrier band (block 490). The signal is then transmitted throughout the air (block 495).

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A radio access point (RAP) system, comprising:
an interconnect;
a first unit coupled to a first end of the interconnect, the first unit being an electronic device without media access control (MAC) processing functionality that includes components to digitally sample a wireless, analog signal thereby producing digital data and to frame the digital data for transmission over the interconnect; and
a switch physically separate from the first unit and coupled to a second end of the interconnect to establish communications with the first unit, the switch including a removable, radio access point (RAP) component to recover the digital data and process the digital data to recover media access control (MAC) frames containing data for transmission over a wired network,
wherein the first unit and the RAP component collectively operating as an access point with the RAP component being responsible for MAC processing and the first unit being responsible for wireless signal processing, the RAP component being removable to allow for substitution of a second RAP component supporting MAC processing different than the MAC processing supported by the RAP component.

2. The RAP system of claim 1, wherein the components of the first unit comprise:
an antenna;
a receive interface in communication with the antenna, the receive interface to produce the audio signal being a baseband analog radio signal; and
an analog-to-digital converter to sample the baseband analog radio signal to produce the digital data.

3. The RAP system of claim 1, wherein the interconnect is a cable supporting the transfer of digital data at two or more bit rates.

4. The RAP system of claim 1, wherein a frame containing the digital data transmitted over the interconnect comprises a payload including the digital data and a header including digital sampling information.

5. The RAP system of claim 4, wherein the header of the frame comprises a sample rate and a number of bits per sample.

6. The RAP system of claim 5, wherein the header of the frame further comprises an identifier of a type of modulation supported by the RAP component of the switch.

7. The RAP system of claim 5, wherein the header of the frame further comprises either a MAC address or port address of a targeted destination device coupled to the wired network.

8. The RAP system of claim 1, wherein the RAP component of the switch is placed on a removable line card coupled to a communication bus of the switch, the line card to be removed and replaced with another line card supporting different wireless communication standards without removing components responsible for digitally sampling and digitizing the wireless analog signal.

9. The RAP system of claim 8, wherein the RAP component of the switch comprises:
a Receive (RX) Physical (PHY) component to demodulate the digital data to recover the MAC frames; and
a Receive (RX) Media Access Control (MAC) component in communication with the RX PHY component, the RX MAC component to convert the MAC frames into a data stream without any wireless local area network (WLAN) protocol content.

10. The RAP system of claim 9, wherein the switch further comprises:
a Receive (RX) wired network interface in communication with the RX MAC component, the RX wired network interface to frame the data stream into one or more Ethernet frames transmitted over the wired network.

11. The RAP system of claim 9, wherein the RAP component of the switch further comprises:
a Transmit (TX) MAC component to receive a first MAC frame having a format in accordance with protocol supported by the wired network and to convert the first MAC frame into a second MAC frame having a format in accordance with a wireless local area network (WLAN) protocol; and
a TX PHY component to modulate the second MAC frame to create a digital baseband radio signal including a plurality of samples for transmission over the interconnect.

12. A method comprising:
providing a radio access point including components for wireless signal transmission and reception, the components of the radio access point having no Media Access Control (MAC) processing functionality;
providing a switch including at least one component responsible for Media Access Control (MAC) processing, the at least one component of the switch is part of a removable, in-line card capable of being removed and replaced with components to support MAC processing for a more recent wireless communication standard without having to replace either the radio access point or the switch; and
coupling the radio access point to the switch using an interconnect, the interconnect to enable the at least one component of the switch to perform MAC processing on data received by the radio access point.

13. The method of claim 12, wherein the coupling of the radio access point and the switch further enables data received by the switch to be converted to a wireless signal for transmission from the radio access point.

14. The method of claim 12 further comprising:
coupling a wired network to the switch.

15. The method of claim 14 further comprising:
receiving a frame over the interconnect by the at least one component of the switch from the components of the radio access point;
recovering a digitally sampled baseband signal from the frame;
demodulating the digitally sampled baseband signal to produce a data stream; and
converting the data stream into a frame having a format recognized by the wired network; and
transmitting the frame over the wired network.

16. The method of claim 12, wherein the switch is an Ethernet switch.

17. An apparatus adapted to a wired network, comprising:
a radio access point to detect a wireless signal, digitally sample the wireless signal in order to produce a digital signal, and transmit the digital signal;
a switch physically separate from the radio access point, the switch including a radio access point (RAP) component to receive the digital data, process the digital data to recover media access control (MAC) frames from the digital signal, convert the MAC frames into a stream of digital data and produce a frame having a format supported by the wired network,
wherein the radio access point and the RAP component of the switch collectively operating as an access point with the RAP component being responsible for MAC frame processing and the radio access point being responsible for wireless signal processing, the RAP component being removable to allow for substitution of a second RAP component supporting MAC processing different that the MAC processing supported by the RAP component.

18. The apparatus of claim 17, wherein the RAP component is a line card including circuitry to process the digital data to recover the MAC frames, convert the MAC frames into the stream of digital data and produce the frame having a format supported by the wired network.

19. The apparatus of claim 17, wherein the RAP component of the switch comprises:
a Receive (RX) Physical (PHY) component to demodulate the digital data to recover the MAC frames; and
a Receive (RX) Media Access Control (MAC) component in communication with the RX PHY component, the RX MAC component to convert the MAC frames into a data stream without any wireless local area network (WLAN) protocol content.

20. The apparatus of claim 19, wherein the switch further comprises:
a Receive (RX) wired network interface in communication with the RX MAC component, the RX wired network interface to frame the data stream into one or more Ethernet frames transmitted over the wired network.

21. The apparatus of claim 19, wherein the RAP component of the switch further comprises:
a Transmit (TX) MAC component to receive a first MAC frame having a format in accordance with protocol supported by the wired network and to convert the first MAC frame into a second MAC frame having a format in accordance with a wireless local area network (WLAN) protocol; and
a TX PHY component to modulate the second MAC frame to create a digital baseband radio signal including a plurality of samples for transmission to the radio access point.

* * * * *